United States Patent [19]

Kobayashi et al.

[11] Patent Number: 4,534,580
[45] Date of Patent: Aug. 13, 1985

[54] SUSPENSION SYSTEM FOR VEHICLES

[75] Inventors: Kazuyoshi Kobayashi, Oobu; Shozo Takizawa, Okazaki, both of Japan

[73] Assignee: Mitsubishi Jidosha Kogyo Kabushiki Kaisha, Tokyo, Japan

[21] Appl. No.: 575,348

[22] Filed: Jan. 31, 1984

[30] Foreign Application Priority Data

Feb. 2, 1983 [JP] Japan ............................. 58-12749[U]

[51] Int. Cl.³ .............................................. B60G 11/26
[52] U.S. Cl. ................................. 280/712; 267/64.24; 267/64.25
[58] Field of Search .............. 280/668, 707, 710, 712, 280/714; 188/285, 299, 319; 267/34, 64.21, 64.24, 64.27, 64.25

[56] References Cited

U.S. PATENT DOCUMENTS 4,313,529  2/1982  Kato et al. ........................... 280/714
4,468,739  8/1984  Woods et al. ........................ 280/707

FOREIGN PATENT DOCUMENTS 2736026  2/1978  Fed. Rep. of Germany ...... 280/707
1447677  6/1966  France ............................... 267/64.24
128820   10/1978  Japan ................................. 267/34
33010    2/1982  Japan .
2081191  2/1982  United Kingdom ............... 188/299
623759   9/1978  U.S.S.R. ............................. 280/707

Primary Examiner—Joseph F. Peters, Jr.
Assistant Examiner—Ross Weaver
Attorney, Agent, or Firm—Robert E. Burns; Emmanuel J. Lobato; Bruce L. Adams

[57]   ABSTRACT

In a switchable suspension system for automobiles and other vehicles, an auxiliary air-spring chamber is provided above a main air-spring chamber in such a manner as to enclose a piston rod so that the spring force of the suspension can be adjusted appropriately. An air passage to connect the two air-spring chambers is provided in the piston rod. The piston rod and a control rod extending inside the piston rod make up a switch valve that controls the opening and closing of the air passage. The air passage of the suspension system is enclosed with a cover to cut off the outward leakage of the noise resulting from the inflow and outflow of air through the air passage that leads from an air compressor to the two air-spring chambers of the suspension system.

8 Claims, 1 Drawing Figure

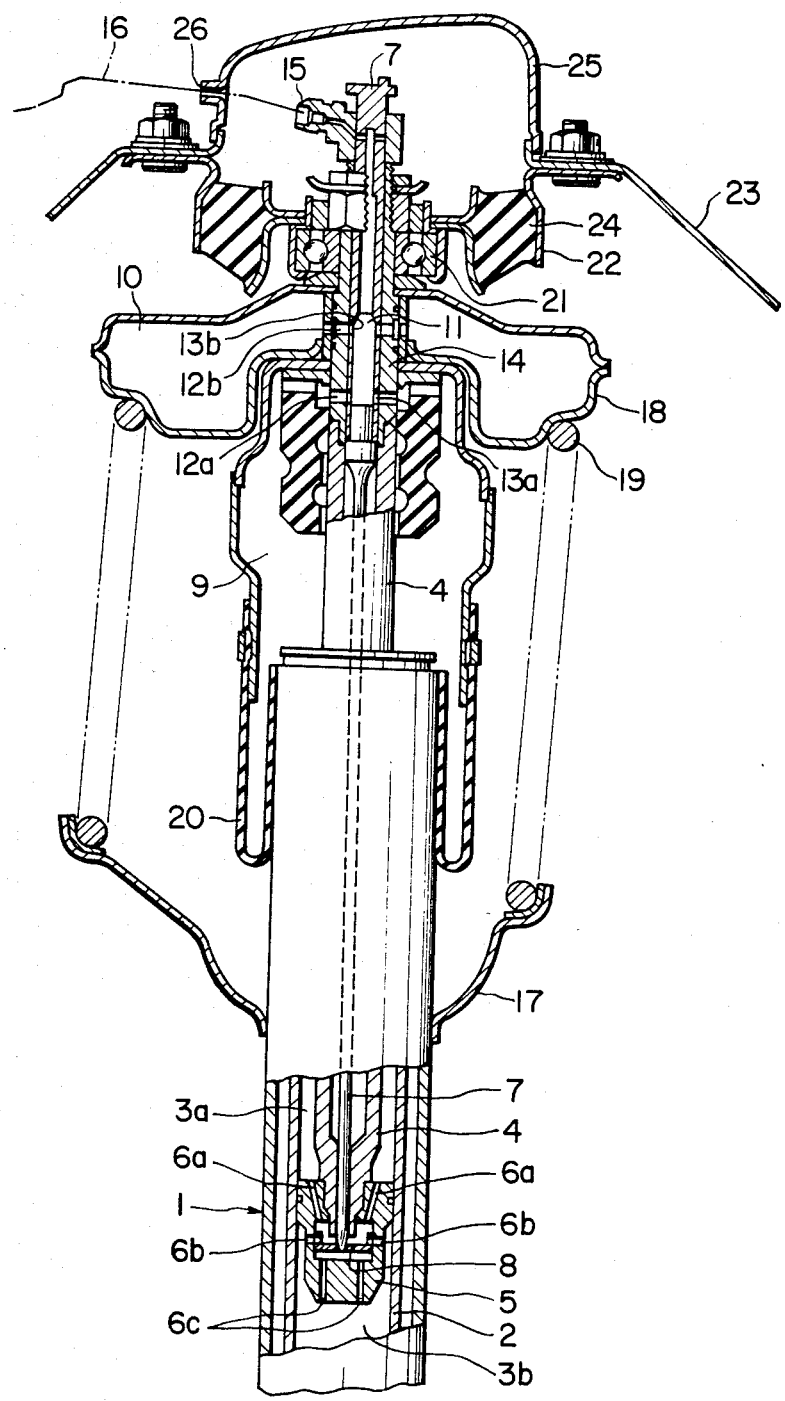

SUSPENSION SYSTEM FOR VEHICLES

BACKGROUND OF THE INVENTION

1. Field of the Invention

This invention relates to an improvement in the suspension system for vehicles equipped with an air-spring-assisted car-height adjusting mechanism.

2. Description of the Prior Art

Some suspension systems for vehicles are equipped with an air-spring-assisted car-height adjusting mechanism.

With this type of conventional suspension systems, however, it has been impossible to change the spring constant freely in accordance with the varying running conditions while maintaining a given car height. So, if the spring constant is preliminarily set at a lower level, the car body rolls and/or pitches heavily, with a resulting impairment of steering stability, when it is exposed to external force. If, on the other hand, the spring constant is set at a higher level to secure steering stability, riding comfort is reduced.

This type of suspension systems also has a modified version which comprises an auxiliary air-spring chamber of a given capacity connected to a main air-spring chamber and a switch valve interposed between the two air-spring chambers. When the switch valve is closed, a relatively large spring force is obtained by use of the air contained in the main air-spring chamber alone. When the switch valve is opened, a relatively small spring force is obtained by use of the air contained in the main and auxiliary air-spring chambers.

This modified version also has not been without shortcomings. Because the auxiliary air-spring chamber is positioned away from the suspension strut, it is necessary to secure a space to place the auxiliary air-spring chamber itself, a passage interconnecting the two air-spring chambers, and the switch valve. It is also necessary to provide some means to protect the interconnecting passage and switch valve.

SUMMARY OF THE INVENTION

This invention has been made in order to obviate the above-described shortcomings with the conventional suspension systems for vehicles.

An object of this invention is to provide a suspension system for vehicles which comprises a main air-spring chamber, an auxiliary air-spring chamber, a passage interconnecting the two air-spring chambers, and a switch valve which is capable of varying the effective capacity of the air-spring chambers, with the auxiliary air-spring chamber and switch valve incorporated in a highly compact manner.

Another object of this invention is to provide a suspension system for vehicles equipped with the two air-spring chambers as described above in which a damping-capacity switching mechanism attached to a shock absorber is actuated simultaneously with the connection and disconnection of the two air-spring chambers.

Still another object of this invention is to provide a suspension system for vehicles equipped with the two air-spring chambers as described above in which the auxiliary air-spring chambers is adapted to function as a spring bearing to support the upper end of a coil spring disposed in parallel with the air-spring chamber for system parts and size reduction.

Yet another object of this invention is to provide a similar suspension system for vehicles which is adapted to reduce the noise that is produced as air flows in and out of the two air-spring chambers when car-height is adjusted.

In order to achieve the objects just described, the improvement according to this invention in the suspension system for vehicles having a shock absorber comprising a cylinder supporting an axle, a piston fitted in the cylinder, dividing the space within the cylinder into two chambers and having orifice passages intercommunicating the two chambers, and a piston rod extending upward from the piston with the upper end thereof supported by the car body is characterized as follows: A main air-spring chamber is provided coaxially around the piston rod and cylinder to support the weight of the car body. An auxiliary air-spring chamber is disposed coaxially around the piston rod and above the main air-spring chamber. A control rod which extends in the longitudinal direction of the piston rod and permits displacement with respect thereto is provided in the piston rod. The peripheral wall of the piston rod surrounding the control rod is provided with an opening communicating with the main and auxiliary air-spring chambers. The control rod has an air passage that connects the main and auxiliary air-spring chambers through the opening in the piston rod and permits air to be supplied into and discharged from the two air-spring chambers. The piston and control rods are designed to function as a switch valve that selectively connects and disconnects the main and auxiliary air-spring chambers through the displacement of the control rod with respect to the piston rod. Furthermore, a silencing cover to reduce the outward leakage of the noise resulting from the flow of air through the air passage in the control rod is provided in such a manner as to enclose the upper end of the piston rod.

Accordingly, the suspension system for vehicles according to this invention provides the following desirable effects or advantages:

(1) Riding comfort and safety are increased by keeping the car's wheels in firm contact with the road and enhancing steering stability depending upon the acceleration and other factors working on the car body while keeping the car height at a given level through the variation of the damping capacity of the shock absorber and the spring constant of the air-spring chambers.

(2) An air-spring chamber consists of a main and auxiliary air-spring chamber, with a switch valve provided therebetween. The spring constant can be changed easily since the capacity of the air-spring chamber is varied by connecting or disconnecting the two air-spring chambers through the actuation of the switch valve.

(3) The auxiliary air-spring chamber and switch valve can be compactly built in a suspension system equipped with the main air-spring chamber.

(4) The spring constant of the air spring and the damping capacity of the shock absorber can be changed simultaneously.

(5) With the bottom surface of the auxiliary air-spring chamber serving also as a spring bearing to support the upper end of the coil spring, both the number of parts and the size of the entire system can be reduced.

(6) The outward leakage of the noise caused by the air supplied to and discharged from the two air-spring chambers for car-height adjustment can be reduced.

BRIEF DESCRIPTION OF THE DRAWING

The accompanying drawing is a vertical cross-section of a suspension system for vehicles embodying the principle of this invention.

DESCRIPTION OF THE PREFERRED EMBODIMENT

The structure and function of a suspension system for vehicles according to this invention will be described in detail hereunder by reference to the accompanying drawing.

The suspension system illustrated is of the strut type, in which reference numeral 1 designates a damping-capacity switchable shock absorber which comprises a cylinder 2 fastened to the wheel side, a piston 5 fitted in the cylinder 2 and dividing the internal space thereof into two hydraulic chambers 3a and 3b, orifice passages 6a, 6b and 6c provided in the piston 5 to connect the two hydraulic chambers 3a and 3b, a piston rod 4 extending upward from the piston 5, a control rod 7 axially extending inside the piston rod 4 and capable of rotating with respect thereto, a control valve 8 attached to the lower end of the control rod 7 to change the effective cross-sectional area of the orifice passages, and an actuator that activates the control valve 8 through the control rod 7. This damping capacity switchable shock absorber 1 effectively absorbs a shock with its damping function that is exercised depending upon the position of the control valve 8 as a cylinder 2 outside the car body moves up and down with respect to the piston rod 4 as the wheel travels up and down. On top of the shock absorber 1, there is provided a main air-spring chamber 9 that coaxially encloses the piston rod 4 and cylinder 2, with an auxiliary air-spring chamber 10 resting directly thereon in such a manner as to enclose said piston rod 4 that is disposed coaxially therewith. The two air-spring chambers 9 and 10 communicate with each other through an air passage 11 formed in the control rod 7, communicating passages 12a and 12b in that portion of the piston rod 4 which surrounds the control rod 7, and communicating passages 13a and 13b in the control rod 7.

When the position of the control rod 7 is changed by rotating, the piston rod 4 and control rod 7, in combination, function as a switch valve 14 that connects and disconnects the two air-spring chambers 9 and 10. Opening and closing the switch valve 14 connects and disconnects the two air-spring chambers 9 and 10, thereby varying the air volume contained in the air-spring chamber and the spring constant of the suspension.

The control valve 8 makes the cross-sectional area of the orifice passages smaller when the switch valve 14 is closed by the control rod 7 than when the switch valve 14 is open.

Car height is adjusted by varying the air volume in the air-spring chamber 9 or in the two air-spring chambers 9 and 10. To a coupling port 15 above the air passage 11 is connected a pipe 16 leading to an air compressor. A solenoid valve is provided midway in the pipe 16. Car height is adjusted by allowing air to flow into and out of the air-spring chambers 9 and 10 through the air passage 11, depending upon the car height or other conditions detected, through the actuation of the solenoid valve.

Reference numeral 19 designates a coil spring that is disposed in such a manner as to enclose the main air-spring chamber 9, with the lower end thereof supported by a sprng bearing 17 fastened to the cylinder 2 and the upper end thereof by the bottom surface 18 of the auxiliary air-spring chamber 10 that projects radially beyond the periphery of the main air-spring chamber 9.

Reference numeral 20 denotes a bellows forming a part of the main air-spring chamber 9, 21 a bearing, 22 a bracket fastening the suspension system through the bearing 21 to a body frame 23, 24 a rubber mount fitted in the bracket 22, 25 a cover attached to the body frame 23 in such a manner as to enclose the upper end of the suspension system, and 26 a hole provided in the cover 25 to pass the pipe 16.

Thus, the auxiliary air-spring chamber 10 is placed above the main air-spring chamber 9 in such a manner as to enclose the piston rod 4. The two air-spring chambers 9 and 10 are connected through the communicating passages 12a, 12b, 13a, 13b and the air passage 11 provided in the piston and control rods 4 and 7. When the control rod 7 is rotated to change the position thereof with respect to the piston rod 4, the two rods, in combination, serve as a switch valve 14 that selectively connects and disconnects the two air-spring chambers 9 and 10. This arrangement is conducive to making the entire system into a highly compact unit.

With the control valve 8 adapted to change the effective cross-sectional area of the orifice passages in the piston 5 is attached to the lower end of the control rod 7, the spring force and damping capacity of the suspension can be switched simultaneously through the rotation of the control rod 7 and the resulting actuation of the switch valve 14.

Since the auxiliary air-spring chamber 10 radially projects beyond the periphery of the main air-spring chamber 9, the bottom surface 18 of the auxiliary air-spring chamber 10 serves as the spring bearing to support te upper end of the coil spring 19. This eliminates the need for providing a special spring bearing for supporting the upper end of the coil spring 19, thereby permitting to reduce the number of parts and the system size.

A cover 25 to enclose the coupling port 15 and other parts at the top of the suspension system is attached to the body frame 23. The cover 25 is effective in materially reducing the outward leakage of the noise generated around the air passage 11 and coupling port 15. A greater silencing effect can be attained by lining the inside of the cover 25 with an acoustic absorber not shown.

What is claimed is:

1. In a suspension system for vehicles equipped with a shock absorber comprising a cylinder supporting an axle, a piston fitted in the cylinder to divide the space therein into two chambers and having orifice passages to connect the two chambers, and a piston rod extending upward from the piston and supported by a car body at the upper end thereof, the improvement which comprises:

a main air-spring chamber coaxially disposed around said piston rod and cylinder to support the weight of a car;

an auxiliary air-spring chamber disposed above said main air-spring chamber and coaxially around said piston rod; and a control rod disposed within said piston rod to extend in the longitudinal direction thereof in such a manner as to be displaceable with respect the piston rod;

that portion of the piston rod which surrounds the control rod having openings communicating with said main and auxiliary air-spring chambers;

the control rod having an air passage through which air is supplied to and discharged from the main and auxiliary air-spring chambers which are connected by the air passage and said openings in the piston rod;

the piston and control rods being adapted to function as a switch valve that selectively connects and disconnects the main and auxiliary air-spring chambers by displacing the control rod with respect to the piston rod; and a silencing cover enclosing the upper end of the piston rod so that the outward leakage of the noise caused by the air flowing through the air passage in the control rod is reduced.

2. The improvement according to claim 1, which comprises a control valve interlocked to the control rod to change the cross-sectional area of the orifice passages in the piston.

3. The improvement according to claim 2, in which the control valve is actuated by the control rod to make the cross-sectional area of the orifice passages smaller when the switch valve is closed than when said switch valve is open.

4. The improvement according to claim 1, which comprises a coil spring surrounding the main air-spring chamber, the lower end of the coil spring supported by one of the cylinder and the piston rod and its upper end supported by the other, the auxiliary air-spring chamber radially projecting beyond the periphery of the main air-spring chamber so that the bottom surface of the auxiliary air-spring chamber functions as a spring bearing to support the upper end of said coil spring.

5. The improvement according to claim 1, in which the control rod is displaceable with respect to the piston rod by rotation, the piston and control rods, in combination, functioning as a switch valve that selectively connects and disconnects the main and auxiliary air-spring chambers as the control rod is rotated with respect to the piston rod.

6. The improvement according to claim 1, in which the cover is attached to a body frame in such a manner as to cover the coupling port at the top of the suspension system.

7. The improvement according to claim 1, in which the cover is attached to the body frame in such a manner as to pass through a pipe connecting an air compressor and the coupling port at the top of the suspension system.

8. The improvement according to claim 1, in which the cover is lined with an acoustic absorber on the inside.

* * * * *